US011724895B1

(12) United States Patent
Kocheta et al.

(10) Patent No.: US 11,724,895 B1
(45) Date of Patent: Aug. 15, 2023

(54) DIRECTED PALLETIZATION USING LIGHTS

(71) Applicant: Amazon Technologies, Inc., Seattle, WA (US)

(72) Inventors: Deepanker Kocheta, Lexington, MA (US); Christopher Brendan Heneghan, Hinsdale, IL (US); Sudha Venkatesan, Westford, MA (US)

(73) Assignee: Amazon Technologies, Inc., Seattle, WA (US)

( * ) Notice: Subject to any disclaimer, the term of this patent is extended or adjusted under 35 U.S.C. 154(b) by 126 days.

(21) Appl. No.: 17/483,486

(22) Filed: Sep. 23, 2021

(51) Int. Cl.
| B65G 57/16 | (2006.01) |
| B65G 43/08 | (2006.01) |
| B07C 3/14 | (2006.01) |
| B07C 3/08 | (2006.01) |

(52) U.S. Cl.
CPC ............... *B65G 57/16* (2013.01); *B07C 3/08* (2013.01); *B07C 3/14* (2013.01); *B65G 43/08* (2013.01); *B65G 2203/0216* (2013.01)

(58) Field of Classification Search
CPC .............................. B65G 57/16; B65G 43/08; B65G 2203/0216; B07C 3/08; B07C 3/14
See application file for complete search history.

(56) References Cited

U.S. PATENT DOCUMENTS

| 6,786,404 | B1* | 9/2004 | Bonner | B07C 3/00 |
| | | | | 235/383 |
| 6,878,896 | B2* | 4/2005 | Braginsky | B07C 7/005 |
| | | | | 700/214 |
| 8,239,291 | B2* | 8/2012 | Hoffman | G06Q 10/087 |
| | | | | 705/28 |
| 8,843,231 | B2* | 9/2014 | Ragusa | B07C 7/005 |
| | | | | 700/226 |
| 9,192,965 | B2* | 11/2015 | Serjeantson | B07C 3/06 |
| 9,193,534 | B2* | 11/2015 | Gehring | G06K 7/10722 |
| 9,592,983 | B2* | 3/2017 | Costanzo | B07C 3/00 |
| 10,471,478 | B2* | 11/2019 | Gil | B65G 15/30 |
| 11,433,429 | B2* | 9/2022 | Ma | B07C 3/08 |
| 2020/0316650 | A1* | 10/2020 | Nagy | B07C 3/008 |
| 2021/0009362 | A1* | 1/2021 | Grupp | B07C 3/08 |
| 2021/0370353 | A1* | 12/2021 | McGrath | G08B 5/38 |
| 2022/0126326 | A1* | 4/2022 | Freeman | B07C 7/005 |
| 2022/0177227 | A1* | 6/2022 | Khodl | G06Q 10/087 |
| 2022/0347724 | A1* | 11/2022 | Fourney | B07C 3/08 |

* cited by examiner

*Primary Examiner* — Patrick H Mackey

(74) *Attorney, Agent, or Firm* — Eversheds Sutherland (US) LLP

(57) ABSTRACT

Systems, methods, and computer-readable media are disclosed for directed palletization using lights. In one embodiment, an example system may include a conveyor configured to support packages, a first set of LEDs disposed along a first side of the conveyor, the first set of LEDs having a first LED, a second set of LEDs disposed adjacent to the first set of LEDs, the second set of LEDs having a second LED, and a first sensor configured to identify packages. The system may include a second sensor disposed on the first side of the conveyor, and a third sensor disposed on the first side of the conveyor. A first color of the first LED may indicate the first package is to be scanned at the second sensor, and a second color of the second LED may indicate the second package is to be scanned at the third sensor.

20 Claims, 8 Drawing Sheets

DIRECTED PALLETIZATION USING LIGHTS

BACKGROUND

During transportation of packages and other items in facilities across logistics networks and last mile delivery, certain packages or other items may be palletized or otherwise aggregated with other packages or items. For example, packages may be sorted and palletized or aggregated based on a destination zip code. In some instances, such sortation and/or palletization of packages or other items may be a manual process in which a human handles the packages or other items and places them onto a pallet. Such manual processes may not only be subject to operator error, but may also be cumbersome and time consuming. Accordingly, directed palletization using lights may be desired.

Figure 1:
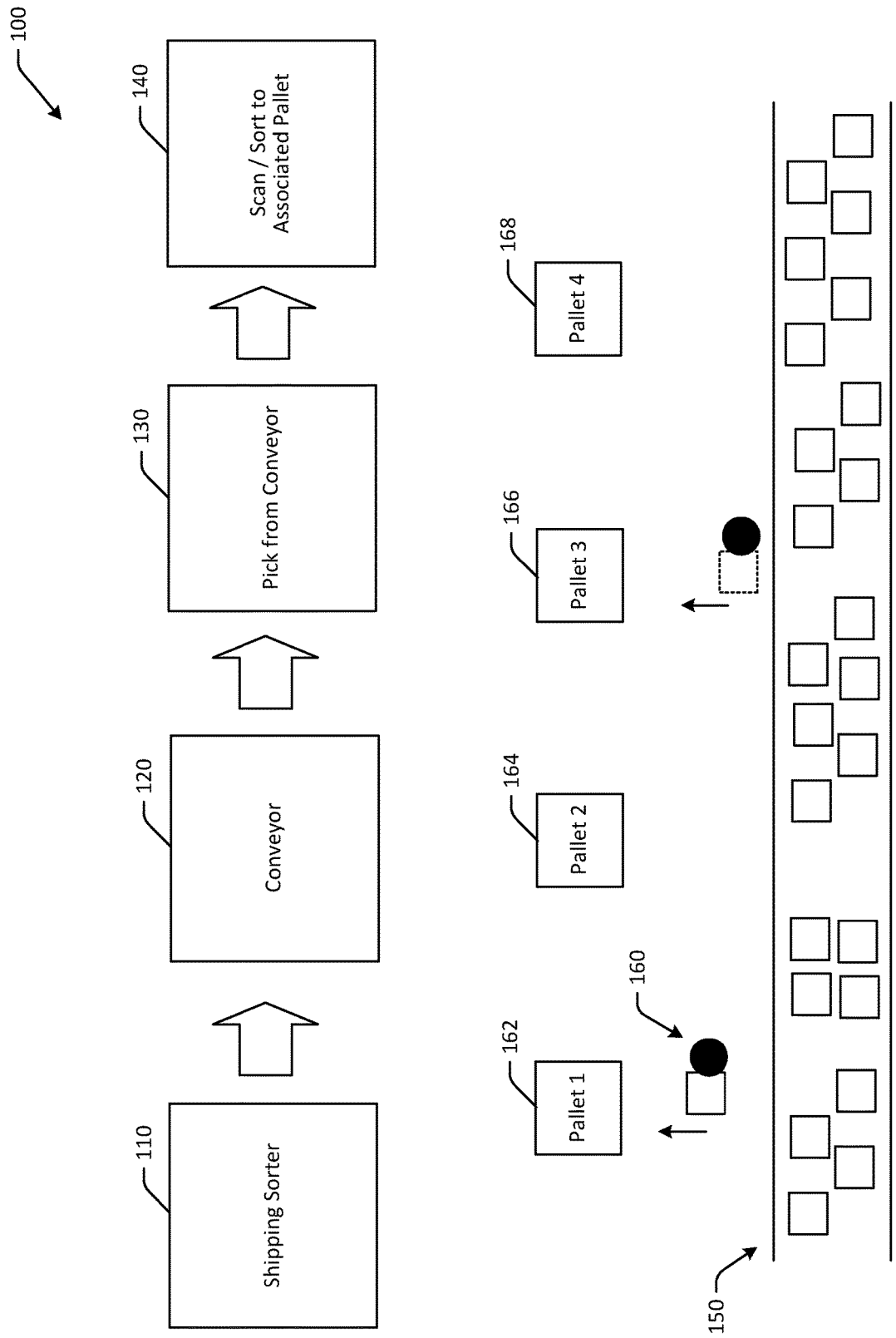
FIG. 1 is a hybrid schematic illustration of an example process flow for palletization of packages and an example schematic illustration of a palletization process.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Various facilities, such as fulfillment centers, sortation centers, and so forth, may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moreover, once products and/or other items are packed into packages, the packages may be handled for sortation and routing to other facilities and/or for last mile delivery. In some instances, after products are packed into packages, the packages may be sorted by various attributes, such as a general destination location or region, destination zip code, a designated third-party shipping provider, and/or other attributes. For example, packages may be sorted using labels affixed to the packages. Packages that are destined for similar locations, such as the same state or country, may be sorted into a first area, whereas packages destined for other locations may be sorted into a second area. Sorting may be automated using scanners or other equipment, manual by operators, or a combination thereof. In some instances, as packages are being sorted, the packages may be aggregated into containers, such as placed onto a pallet, placed into a Gaylord or cart, etc. for subsequent shipping. Containers may be filled with packages, or in the case of pallets, a pallet may be a portable platform on which goods can be stored. Pallets may be optionally wrapped and moved using manual or mechanical equipment, such as a forklift. Packages on a pallet or in a container may be sorted into the same category, which may be a destination-based category or any other suitable category. Once a pallet or other container is full, the container may be loaded into a shipping container, onto a truck, or otherwise shipped to a subsequent destination. The subsequent destination may be a waypoint, a final destination, or a different destination. In some instances, the pallet or container may be "broken down," in that packages may be removed from the container and then resorted at a different sorting center using the same or different criteria. For example, a package destined for Seattle from Atlanta may be placed on a pallet bound for Chicago, where the pallet may be broken down and the package may subsequently be placed on another pallet bound for Seattle. In other instances, the pallet may remain intact until reaching a local delivery station.

To build or form pallets, or to otherwise fill containers, in some instances, operators may manually retrieve packages, such as from a conveyor belt, and place the packages on a pallet or into a container. Packages, as described herein, may include boxes, items (e.g., wrapped and unwrapped items, such as basketballs, bananas, etc.), objects, bags of boxes or envelopes, totes, containers, and so forth. When the container or pallet is complete, the operator may optionally close the container or wrap the pallet and send the pallet to a loading station for loading into a truck or shipping container. However, such manual operation may be time consuming and may increase ergonomic stress for operators, as packages may be of non-uniform size or weight, and a distance between a conveyor belt and a pallet may be relatively long.

To decrease ergonomic stress for operators, as well as to reduce a likelihood that an incorrect package is retrieved by an operator, embodiments of the disclosure include directed palletization using lights that may reduce an amount of manual effort (e.g., number of steps, etc.) needed from operators to palletize packages or other items, reduce an amount of time spent placing packages on pallets, reduce a distance that operators may have to travel with packages, and/or may increase efficiency of packages that are sorted and/or palletized by reducing mis-picked packages or items. Palletization may refer to the process of placing packages from conveyors into containers or onto pallets. Certain embodiments may include lighting systems that provide visual indications to operators of the packages that the operator is to retrieve from a conveyor, as well as an indication of which scanner should be used to scan the package or item, where the scanner is intelligently selected based on factors such as the distance from the scanner to the destination container. Some embodiments include automated package or item assignment functionality that allows for packages having flexible container destinations (e.g., the package can be sorted into more than one container or pallet, etc.) to be assigned to different operators based on factors such as current package load on an operator, total package load on an operator, upcoming package load for an operator, current container fill rates, and/or other factors. As a result, operator workload may be reduced, throughput of fulfillment centers may be improved, and/or logistics of fulfillment center operations may be less complicated.

Referring to FIG. 1, an example use case 100 of a sorting area at a facility, such as a fulfillment center or other location, and an example process flow, is depicted. Although discussed in the context of packages, other embodiments may be directed to any suitable use case where items or other objects are sorted.

In FIG. 1, a fulfillment center may include a shipping sorter 110 and a conveyor system 120. The shipping sorter 110 may include various materials handling equipment configured to divert or otherwise guide packages to certain locations. For example, the shipping sorter 110 may induct packages, determine a designated location to sort respective packages, and may direct the packages to the designated location using any combination of materials handling equipment, such as conveyors, belts, mechanical arms, and/or other components. The shipping sorter 110 may include one or more scanners to identify packages and/or destinations associated with packages.

Packages may be diverted from the shipping sorter 110 to one or more conveyors of the conveyor system 120. The conveyors may be used to guide packages to a palletization area, where operators may retrieve the packages from the conveyor. Packages destined for one or more pallets may be sent down the same conveyor.

At operation 130, an operator may pick packages from the conveyor, and at operation 140, the operator may sort the package to an associated pallet. For example, the operator may manually scan the package and may determine which pallet the package is associated with, as different pallets may be headed to different locations. The operator may then place the package on the associated pallet.

In FIG. 1, an example use case of a conveyor 150 is illustrated, with an operator 160 retrieving packages from the conveyor 150 and placing the package on an associated pallet, such as a first pallet 162. In some instances, such as that illustrated in FIG. 1, there may be multiple pallets, such as a second pallet 164, a third pallet 166, a fourth pallet 168, and so forth, and more than one operator moving packages between the conveyor 150 and the associated pallets. Operators may pick packages from both sides of the conveyor 150.

A distance between the pallets and the conveyor 150 may be relatively long, resulting in increased manual effort by the operator 160 when handling and moving packages. In addition, manual scanning of packages may increase the amount of time it takes for the operator to determine an associated pallet because there may be more than one scanner that can be used to scan or otherwise identify the package, and some scanners may be closer to a destination pallet for a package (e.g., the pallet or container on which the package is to be placed, etc.) than others. As a result, the palletization process may be time consuming and/or cumbersome. In addition, operators may scan packages that have destination containers on the other side of the conveyor 150, and may therefore have to place the package back onto the conveyor 150 for an operator on an opposite side of the conveyor 150 to retrieve, resulting in wasted effort.

Figure 2:
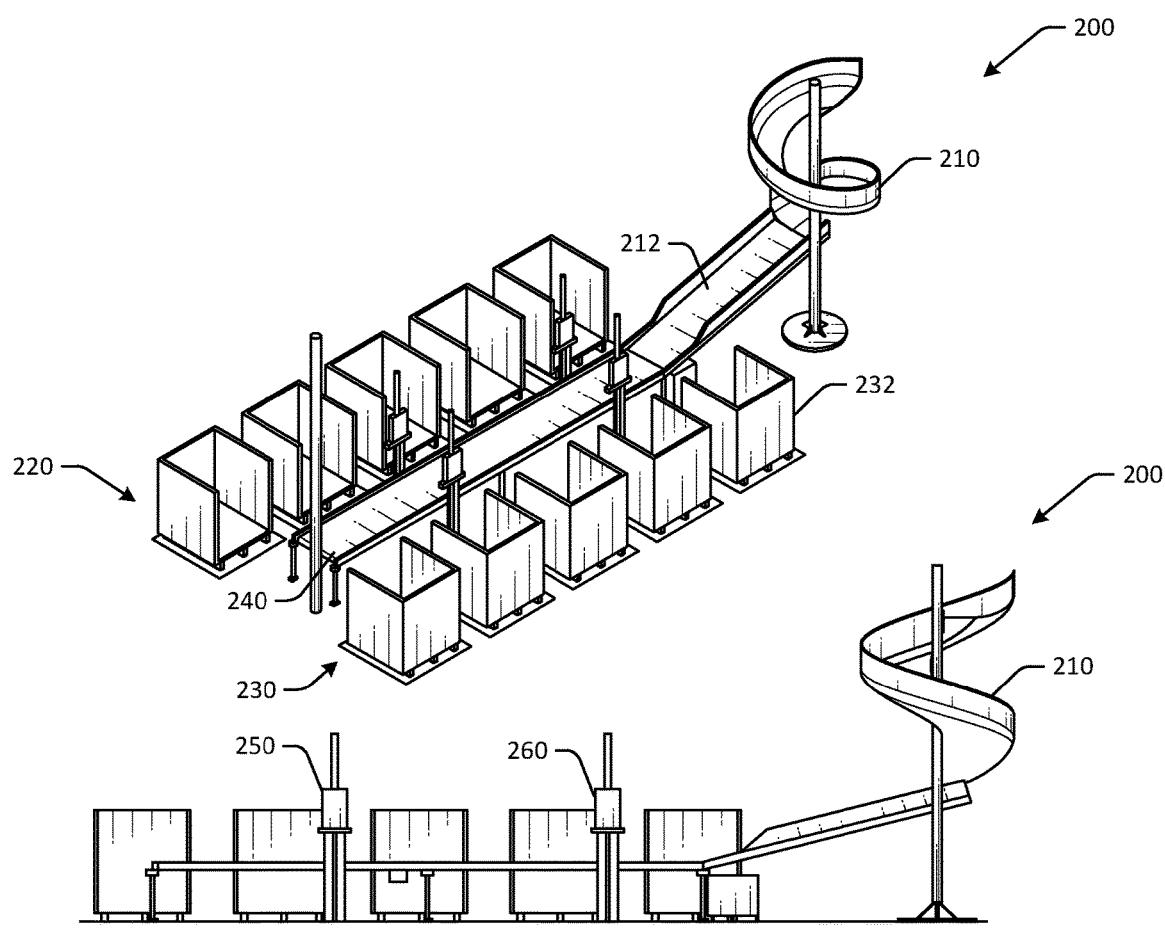
FIG. 2 is a schematic illustration of an example palletization system in various views.
Figure 2:
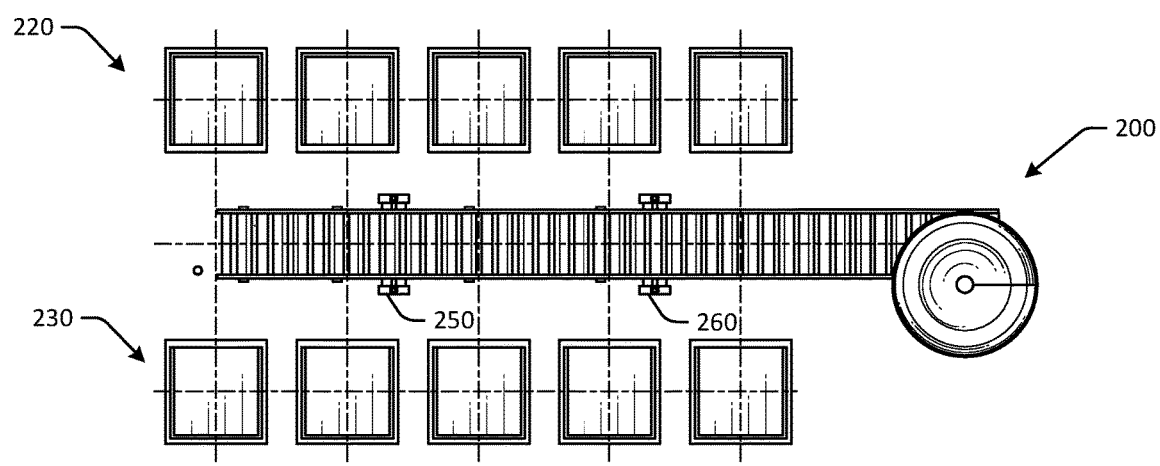

FIG. 2 is a schematic illustration of an example palletization system 200 in various views. Other embodiments may include additional or fewer components. Although discussed in the context of packages, other embodiments may be directed to any suitable use case where items or other objects are sorted.

In FIG. 2, a fulfillment center or other facility may include a conveyor system 240. The conveyor system 240 may include various material handling equipment configured to divert or otherwise guide packages to certain locations. For example, the conveyor system 240 may include one or more chutes 210, one or more ramps 212, and so forth that may guide packages or other objects to different destinations. Operators may remove the packages from the conveyor system 240 and place the packages into one or more containers, such as containers on a first side 220 of the conveyor system 240 or containers on a second side 230 of the conveyor system 240. For example, a first container 232 may be disposed on the second side 230 of the conveyor system 240. Any number of containers may be included. Although depicted as a certain type of walled container in FIG. 2, other embodiments may use different containers, such as pallets, Gaylords, carts, and/or other types of containers. During use, the conveyor system 240 may be used to direct the packages to the designated location using any combination of materials handling equipment, such as conveyors, belts, mechanical arms, and/or other components.

The palletization system 200 may include one or more scanners to identify packages and/or destinations associated with packages. For example, as depicted in the side view and top view of the palletization system 200 in FIG. 2, the palletization system 200 may include a first scanner 250 on the second side 230 of the conveyor system 240, and a second scanner 260 on the second side 230 of the conveyor system 240. Any number of scanners may be used. Additional scanners may be disposed on the first side 220 of the conveyor system 240. The scanners may be used to scan or otherwise identify packages that are retrieved from the conveyor system 240. In some instances, packages may be scanned at the scanners before being placed into respective containers. The scanner may indicate which container the package is to be placed into. An operator may therefore retrieve a package from the conveyor system 240, scan the package at a scanner, determine which container the package is to be deposited into, and then deposit the package into the container. Once the package is deposited, the operator may optionally press a button or otherwise perform an action indicating that the package has been deposited into the destination container.

In systems without the directed palletization using lights as described herein, operators may pick up and scan packages that are not to be placed into containers on their side of the conveyor system 240 (e.g., an operator on the first side 220 scans a package that is destined for a container on the second side 230 of the conveyor system 240, etc.), resulting in wasted effort as the operator may replace the package onto the conveyor. Moreover, wasted effort may occur if the operator scans the package at a scanner that is not closest to the destination container, in which case the operator may have to retrace their steps. In addition to other benefits, such wasted effort may be avoided by embodiments of the disclosure. Directed palletization using lights as described herein may also decrease the amount of time it takes for the operator to move packages from the conveyor system 240 to the associated pallet or container.

Embodiments of the disclosure include directed palletization using lights. Certain embodiments may improve processing speed and/or throughput of fulfillment or sortation centers. Certain embodiments may improve performance of mechanical equipment for sortation and/or consolidation of packages or items for palletization. While described in the context of packages, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment or sortation centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
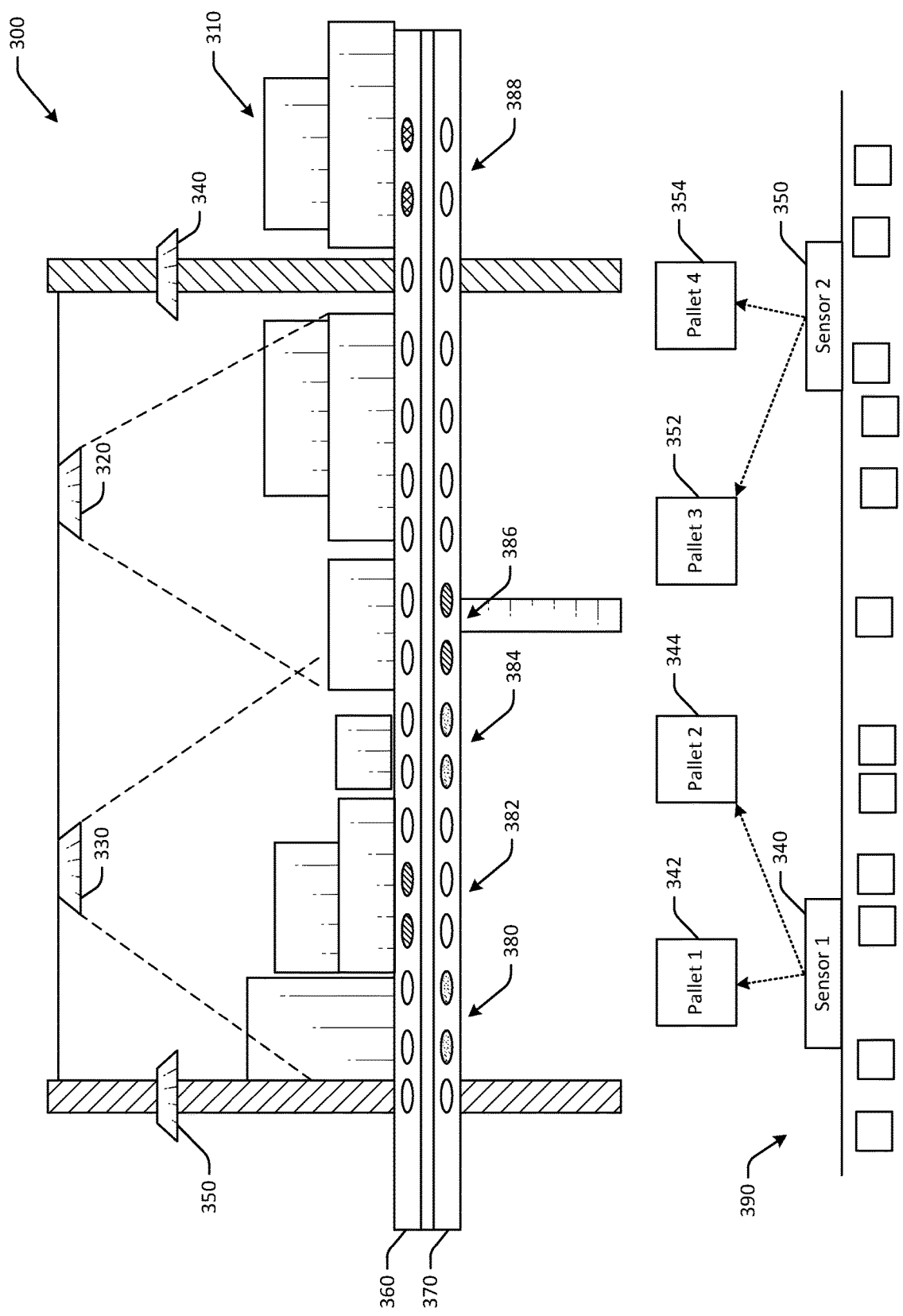
FIG. 3 is a schematic illustration of an example directed palletization system that uses lights in accordance with one or more embodiments of the disclosure.

FIG. 3 is a schematic illustration of an example directed palletization system 300 that uses lights in accordance with one or more embodiments of the disclosure. Other embodiments may include additional or fewer components. The illustration of FIG. 3 may not be to scale, and may not be illustrated to scale with respect to other figures. The directed palletization system illustrated in FIG. 3 may be the same directed palletization system discussed with respect to FIG. 1 and may be used with the palletization system described with respect to FIG. 2.

The directed palletization system 300 may use one or more lighting indicators, such as light emitting diodes (LEDs) that reduce the amount of effort operators have to exert when palletizing packages, and also improves ergonomics for operators by reducing the amount of walking associates have to do when handling packages. The LEDs are used in combination with cameras and/or scanners to identify which packages are to be handled by a particular operator, thereby also reducing the number of rejects or mis-picked packages, that an operator picks up, only to put back on a conveyor. If a particular package is to be handled by an operator on the side of the conveyor, a corresponding LED color will be illuminated and can indicate to the operator not only that they are to handle the package, but also the closest scanner to the package destination, thereby reducing the number of steps the associate has to take to deposit the package at its destination.

In the example of FIG. 3, the directed palletization system 300 may be used to provide visual guidance to operators for packages 310 moving along a conveyor. The directed palletization system 300 may include one or more overhead sensors, such as a first camera 320 and a second camera 330 that may be used to identify and/or track packages moving along the conveyor. The cameras may be configured to use computer vision or other package tracking methods. Other embodiments may use different types of sensors. The sensors may be placed elsewhere in other embodiments instead of the overhead arrangement depicted in the example of FIG. 3. In the example of FIG. 3, the packages 310 may move from right to left with respect to the page. As the packages 310 move along the conveyor, the first camera 320 and/or the second camera 320 may identify the packages using labels or other machine-readable codes on the packages 310.

One or more sensors may be disposed along the sides of the conveyor. For example, a first scanner 340 and a second scanner 350 may be disposed on a first side of the conveyor. Additional scanners or other types of sensors may be disposed on the first side of the conveyor and/or the second side of the conveyor. The first scanner 340 and the second scanner 350 may be used to scan packages that have been retrieved by operators. In some embodiments, the scanners may provide the package destination, such as by presenting a container identifier after a package is scanned or otherwise sensed.

The directed palletization system 300 may include one or more lighting indicators, such as LEDs. The LEDs may be arranged in one or more rows. In some embodiments, the LEDs may be formed on strips that can be coupled to the sides of the conveyor. For example, in FIG. 3, the directed palletization system 300 may include a first row of LEDs 360 and a second row of LEDs 370. Any number of rows may be used and any other type of suitable lighting indicator may be used instead of LEDs. The LEDs may be arranged in different formation than the rows depicted in FIG. 3. Some embodiments may include one row or column, or set, of LEDs, whereas other embodiments may include more than two rows or columns of LEDs. In the example of FIG. 3, there may be two packages in a side-by-side arrangement moving along the conveyor, and the two rows of LEDs may represent the packages on either the near side or far side of the conveyor. For example, the LEDs on the upper row or first row of LEDs 360 may represent packages on a far side of the conveyor, and LEDs on the lower row or second row of LEDs 370 may represent packages on a near side, or a closer side, of the conveyor.

As depicted in top schematic view 390, the sensors or scanners 340, 350 may be disposed at different positions along the side of the conveyor. The first scanner 340 may be relatively closer to a first pallet 342 and a second pallet 344 than the second scanner 350, and the second scanner 350 may be relatively closer to a third pallet 352 and a fourth pallet 354 than the first scanner 340. Accordingly, packages having a package destination of the first pallet 342 or the second pallet 344 may be scanned at the first scanner 340 to reduce the amount of walking or effort exerted by an operator, and packages having a package destination of the third pallet 352 or the fourth pallet 354 may be scanned at the second scanner 350 to reduce the amount of walking or effort exerted by an operator.

To indicate which scanner or sensor should be used to scan a package, the directed palletization system 300 may cause the individual LEDs associated with a package to illuminate in a color associated with a particular scanner. For example, one or more first LEDs 380 in the second row of LEDs 370 may indicate that the package above the first LEDs 380 on the near side of the conveyor is to be picked up by an operator on the same side of the conveyor as the first LEDs 380. The color of the first LEDs 380 may indicate that the package is to be scanned at the first scanner 340. This may be because the package has a package destination of the first pallet 342 or the second pallet 344, and the first scanner 340 is closer to the first pallet 342 and the second pallet 344 than the second scanner 350. Some embodiments may not include the color-based scanner indicator feature. Illumination or color of light emitted by the LEDs in FIG. 3 are represented with different shading patterns.

One or more second LEDs 382 in the first row of LEDs 360 may indicate that the package above the second LEDs 382 on the far side of the conveyor is to be picked up by an operator on the same side of the conveyor as the second LEDs 382. The color of the second LEDs 382 may indicate that the package is to be scanned at the second scanner 350. This may be because the package has a package destination of the third pallet 352 or the fourth pallet 354, and the second scanner 350 is closer to the third pallet 352 and the fourth pallet 354 than the first scanner 340.

One or more third LEDs 384 in the second row of LEDs 370 may indicate that the package above the third LEDs 384 on the near side of the conveyor is to be picked up by an operator on the same side of the conveyor as the third LEDs 384. The color of the third LEDs 384 may indicate that the package is to be scanned at the first scanner 340. This may be because the package has a package destination of the first pallet 342 or the second pallet 344, and the first scanner 340 is closer to the first pallet 342 and the second pallet 344 than the second scanner 350.

One or more fourth LEDs 386 in the second row of LEDs 370 may indicate that the package above the fourth LEDs 386 on the near side of the conveyor is to be picked up by an operator on the same side of the conveyor as the fourth LEDs 386. The color of the fourth LEDs 386 may indicate that the package is to be scanned at the second scanner 350. This may be because the package has a package destination of the third pallet 352 or the fourth pallet 354, and the second scanner 350 is closer to the third pallet 352 and the fourth pallet 354 than the first scanner 340.

Additional light colors or illumination patterns of LEDs or other lighting indicators may be used. For example, a purple color or light may be used to illuminate one or more fifth LEDs 388 indicating that a certain package cannot be read or to otherwise indicate exception handling. In some embodiments, the first scanner 340 may be associated with a first color of light, such as green, and the second scanner 350 may be associated with a second color of light, such as red. Any suitable colors of light and/or illumination patterns may be used to represent different scanners, different package destinations, whether packages can be identified, and/or other features.

For packages that are stacked on other packages, the LEDs may be used to indicate the scanner and operator for the package on top of the stacked packages. As the packages are removed, the LEDs may be updated to reflect the scanner and operator for the packages that are revealed as packages are removed from a stack. Similarly, as packages move slowly along the conveyor, the LEDs associated with packages may change and follow the packages as the packages move along the conveyor. For example, one LED may be turned off and an adjacent LED may be illuminated as a package moves along the conveyor.

Accordingly, a system 300 may include an optional conveyor configured to support packages, such as a first package, a second package, and a third package, where the first package is adjacent to the second package on the conveyor in a side-by-side arrangement, and the third package is stacked on the second package. The system may include a first overhead sensor, such as the first camera 320, disposed over a first portion of the conveyor, where the first overhead sensor can be configured to identify packages. The system may include a second overhead sensor, such as the second camera 330, disposed over a second portion of the conveyor, the second overhead sensor can be configured to identify packages. The system may include the first scanner 340 disposed adjacent to the first portion of the conveyor, where the first scanner 340 may be configured to scan a machine-readable code on packages. The system may include the second scanner 350 disposed adjacent to the second portion of the conveyor, where the second scanner 350 may be configured to scan a machine-readable code on packages. The system may include the first row of LEDs 360 disposed along a first side of the conveyor, the LEDs configured to emit light having a first color and light having a second color, and the second row of LEDs 370 disposed adjacent to the first row of LEDs 360, the LEDs configured to emit light having the first color and light having the second color.

Some embodiments may include a third row of LEDs disposed along a second side of the conveyor (e.g., the opposite side of the conveyor than that illustrated in FIG. 3), the LEDs configured to emit light having the first color and light having the second color, and a fourth row of LEDs disposed adjacent to the third row of LEDs, the LEDs configured to emit light having the first color and light having the second color. The LEDs on the opposite side may be used to indicate package handling instructions for an operator on that side of the conveyor.

The first row of LEDs 360 may include a first LED adjacent to the first package, and the second row of LEDs 370 may include a second LED adjacent to the first package. On the other side of the conveyor, the third row of LEDs may include a third LED adjacent to the second package, and the fourth row of LEDs may include a fourth LED adjacent to the second package. A color of the first LED may indicate that the first scanner 340 is to be used to scan a first machine-readable code on the first package, and a color of the second LED may indicate that the second scanner 350 is to be used to scan a second machine-readable code on the third package.

In some embodiments, packages may be assigned to one operator or the other, but not both at the same time. In such embodiments, one of either the first LED or the third LED can be illuminated at a same time, and one of either the second LED or the fourth LED is illuminated at the same time. For example, the same LED associated with a package on both sides of the conveyor may not be illuminated at the same time, so as to cause both operators to attempt to retrieve the package. In other embodiments, illumination of LEDs on both sides may be possible, where the LEDs are cleared or turned off after an operator on either side retrieves the package.

A computer system associated with the directed palletization system 300 may determine, using the first scanner, that a first machine-readable code on the first package has been scanned, and may cause presentation of a package destination for the first package. The computer system may determine that the first package has been deposited at the package destination, for example via acknowledgment interaction by the operator with a button or other interaction.

Figure 4:
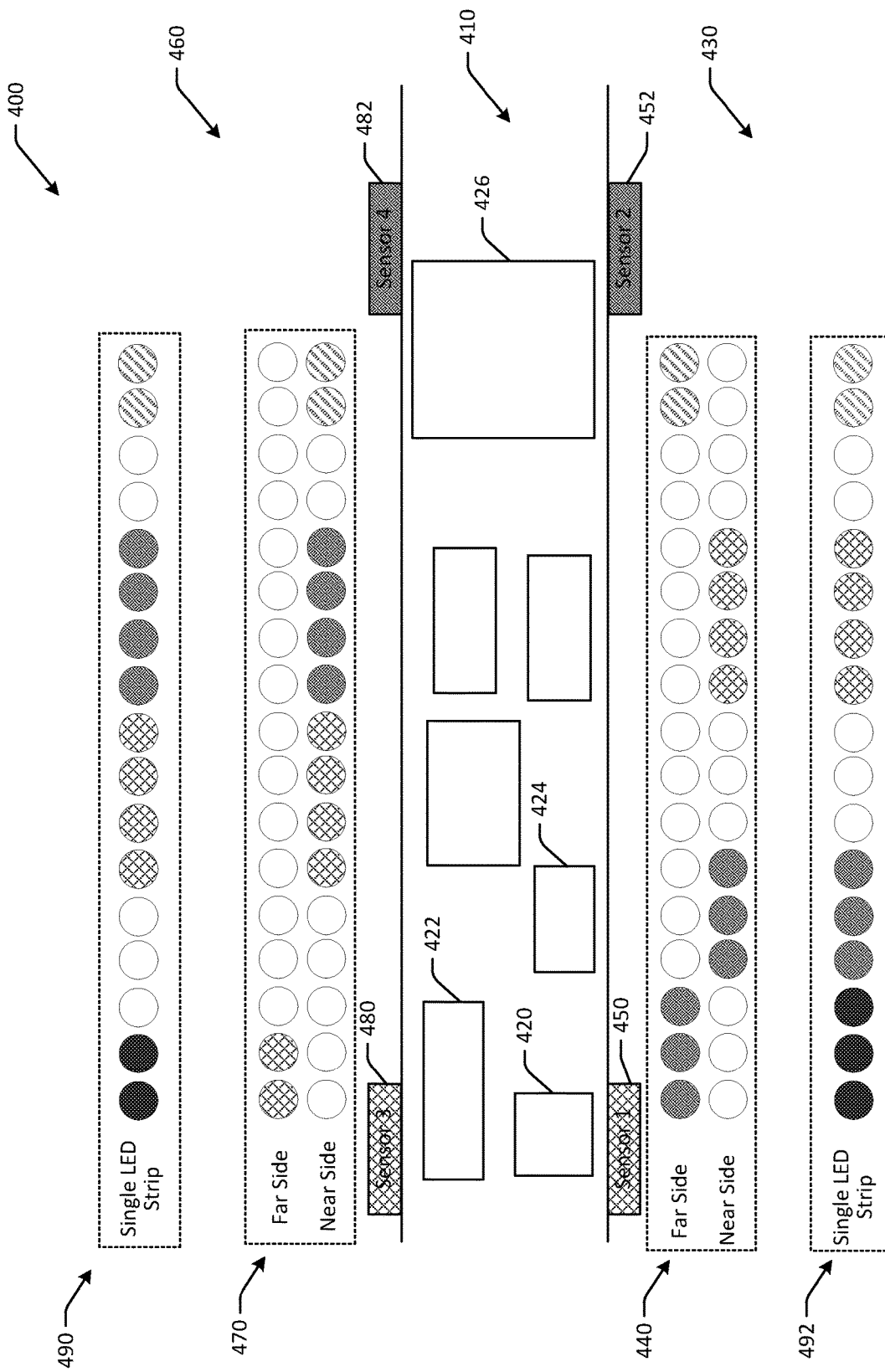
FIG. 4 is a schematic illustration of a top view of a directed palletization system with various lighting configurations in accordance with one or more embodiments of the disclosure.

FIG. 4 is a schematic illustration of a top view of a directed palletization system 400 with various lighting configurations in accordance with one or more embodiments of the disclosure. Other embodiments may include additional or fewer components. The illustration of FIG. 4 may not be to scale, and may not be illustrated to scale with respect to other figures. The directed palletization system illustrated in FIG. 4 may be the same directed palletization system discussed with respect to FIGS. 1-3.

In FIG. 4, a top view of a conveyor 410 is depicted with a first package 420, a second package 422, a third package 424, and a fourth package 426 disposed thereon. Some of the packages may be in a side-by-side arrangement, some packages may be stacked on others, and some packages may cover a majority of a width of the conveyor, such as the fourth package 426. Packages may be separated along a length of the conveyor, such that a package is adjacent to a downstream portion of the conveyor, and another package is adjacent to an upstream portion of the conveyor.

Sensors, such as barcode scanners or other sensors, may be disposed on a first side 430 of the conveyor 410 and a second side 460 of the conveyor 410. For example, a first sensor 450 and a second sensor 452 may be disposed on the first side 430 of the conveyor 410, and a third sensor 480 and a fourth sensor 482 may be disposed on the second side 460 of the conveyor 410. Any number of sensors may be used. The sensors may be used to determine package destinations, such as which container a package is to be placed into.

Various lighting configurations are depicted in FIG. 4. For example, a first lighting configuration 440 may include multiple rows of LEDs or other lighting indicators, where a first row is used to indicate whether a package on a far side of the conveyor 410 (e.g., where far side is the second side 460 relative to the first side 430 of the conveyor 410, etc.) is to be retrieved, and a color of light emitted by an LED may be used to indicate which sensor (e.g., Sensor 1 or Sensor 2, etc.) is to be used to sense or scan the package. Other embodiments may have different configurations of lights, such as vertically aligned lights, laterally aligned lights as depicted in FIG. 4, or other configurations. The sensor may be selected based at least in part on which sensor is closer to the package destination container. The first lighting configuration 440 may include a second row of LEDs to indicate whether a package on a near side of the conveyor 410 (e.g., where near side is the first side 430 of the conveyor 410 from the perspective of an operator on the first side 430, etc.) is to be retrieved, and a color of light emitted by an LED may be used to indicate which sensor (e.g., Sensor 1 or Sensor 2, etc.) is to be used to sense or scan the package.

In the example of FIG. 4, the first lighting configuration indicates that the second package 422 is to be retrieved and scanned at the second sensor 452, the third package 424 is to be retrieved and scanned at the first sensor 450, and the fourth package 426 is a flexible package that can optionally be retrieved and scanned at either sensor. Different colors of light or different lighting patterns (e.g., flashing, etc.) may be used to indicate the different sensors and other features. The cross-hatching pattern in FIG. 4 may indicate that the corresponding package has not been identified.

In some embodiments, a single set of LEDs may be used instead of multiple rows or sets of LEDs. For example, a second lighting configuration 492 includes a single strip of LEDs that can also indicate whether a package on a near side of the conveyor 410 (e.g., where near side is the first side 430 of the conveyor 410 from the perspective of an operator on the first side 430, etc.) is to be retrieved, and a color of light emitted by an LED may be used to indicate which sensor (e.g., Sensor 1 or Sensor 2, etc.) is to be used to sense or scan the package. However, for packages on the far side, the corresponding LEDs may illuminate in a different color and the operator may scan the package at any sensor, as the closest sensor may not be indicated by the color of light.

Similarly, on the second side 460 of the conveyor 410, the first lighting configuration is represented as two rows of LEDs 470 on the second side 460 of the conveyor 410. The first row may be used to indicate whether a package on a far side of the conveyor 410 (e.g., where far side is the first side 430 relative to the second side 460 of the conveyor 410, etc.) is to be retrieved, and a color of light emitted by an LED may be used to indicate which sensor (e.g., Sensor 3 or Sensor 4, etc.) is to be used to sense or scan the package. The sensor may be selected based at least in part on which sensor is closer to the package destination container. The first lighting configuration may include a second row of LEDs to indicate whether a package on a near side of the conveyor 410 (e.g., where near side is the second side 460 of the conveyor 410 from the perspective of an operator on the second side 460, etc.) is to be retrieved, and a color of light emitted by an LED may be used to indicate which sensor (e.g., Sensor 3 or Sensor 4, etc.) is to be used to sense or scan the package.

In the example of FIG. 4, the first lighting configuration indicates that the first package 420 is to be retrieved and scanned at the third sensor 480, another package is to be retrieved and scanned at the fourth sensor 482, and the fourth package 426 is a flexible package that can optionally be retrieved and scanned at either sensor. Different colors of light or different lighting patterns (e.g., flashing, etc.) may be used to indicate the different sensors and other features. The cross-hatching pattern in FIG. 4 may indicate that the corresponding package has not been identified.

In a second lighting configuration 490 on the second side 460, the second lighting configuration includes a single strip of LEDs that can also indicate whether a package on a near side of the conveyor 410 (e.g., where near side is the second side 460 of the conveyor 410 from the perspective of an operator on the second side 460, etc.) is to be retrieved, and a color of light emitted by an LED may be used to indicate which sensor (e.g., Sensor 3 or Sensor 4, etc.) is to be used to sense or scan the package. However, for packages on the far side, the corresponding LEDs may illuminate in a different color and the operator may scan the package at any sensor, as the closest sensor may not be indicated by the color of light.

Figure 5:
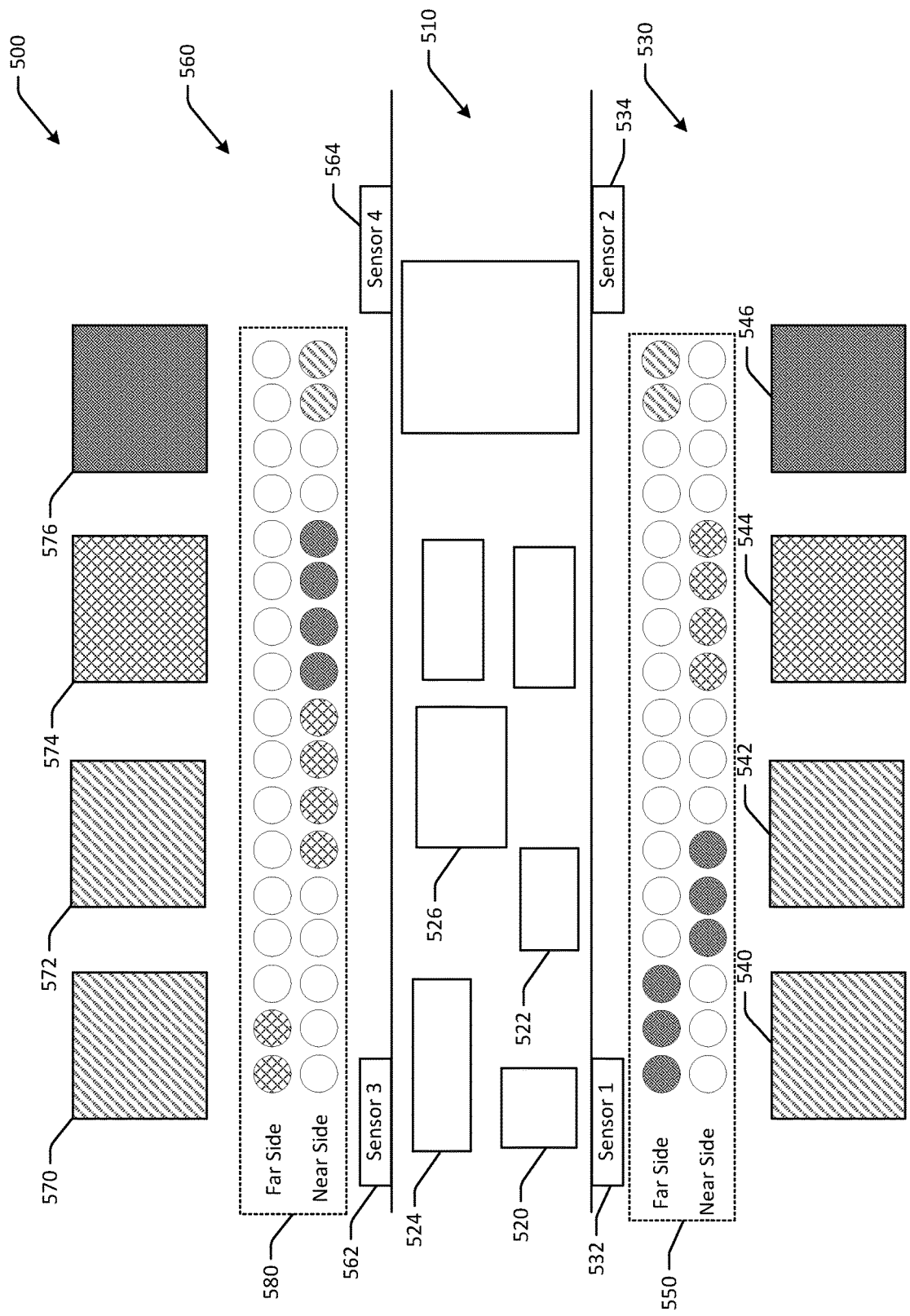
FIG. 5 is a schematic illustration of a top view of a directed palletization system with various lighting configurations in accordance with one or more embodiments of the disclosure.

FIG. 5 is a schematic illustration of a top view of a directed palletization system 500 with various lighting configurations in accordance with one or more embodiments of the disclosure. Other embodiments may include additional or fewer components. The illustration of FIG. 5 may not be to scale, and may not be illustrated to scale with respect to other figures. The directed palletization system illustrated in FIG. 5 may be the same directed palletization system discussed with respect to FIGS. 1-4.

In FIG. 5, containers are depicted adjacent to a conveyor. In some embodiments, the directed palletization system 500 may use lighting indicators and/or colors of light to indicate which container a package is to be placed into, so as to bypass the need for scanning the package entirely. For example, a top view of a conveyor 510 is depicted with a first package 520, a second package 522, a third package 524, and a fourth package 526 disposed thereon. Some of the packages may be in a side-by-side arrangement, some packages may be stacked on others, and some packages may cover a majority of a width of the conveyor. Packages may be separated along a length of the conveyor, such that a package is adjacent to a downstream portion of the conveyor, and another package is adjacent to an upstream portion of the conveyor.

Sensors, such as barcode scanners or other sensors, may be disposed on a first side 530 of the conveyor 510 and a second side 560 of the conveyor 510. For example, a first sensor 532 and a second sensor 534 may be disposed on the first side 530 of the conveyor 510, and a third sensor 562 and a fourth sensor 564 may be disposed on the second side 560 of the conveyor 410. Any number of sensors may be used.

A first set of containers may be disposed on the first side 530 of the conveyor 510. The first set of containers may include a first container 540, a second container 542, a third container 544 and a fourth container 546. A second set of containers may be disposed on the second side 560 of the conveyor 510. The second set of containers may include a fifth container 570, a sixth container 572, a seventh container 574, and an eighth container 576.

An example lighting configuration 550 may include multiple rows of LEDs or other lighting indicators, where a first row is used to indicate whether a package on a far side of the conveyor 510 is to be retrieved, and a color of light emitted by an LED may be used to indicate which container the package is to be deposited in. For example, the second package 522 and the third package 524 may be deposited into the fourth container 546, and so forth. On the second side, an example lighting configuration 580 may include multiple rows of LEDs or other lighting indicators, where a first row is used to indicate whether a package on a far side of the conveyor 510 is to be retrieved, and a color of light emitted by an LED may be used to indicate which container the package is to be deposited in. For example, the first package 520 and the fourth package may be deposited into the seventh container 574. The operator may therefore not have to scan the packages prior to depositing the respective packages into the containers.

Figure 6:
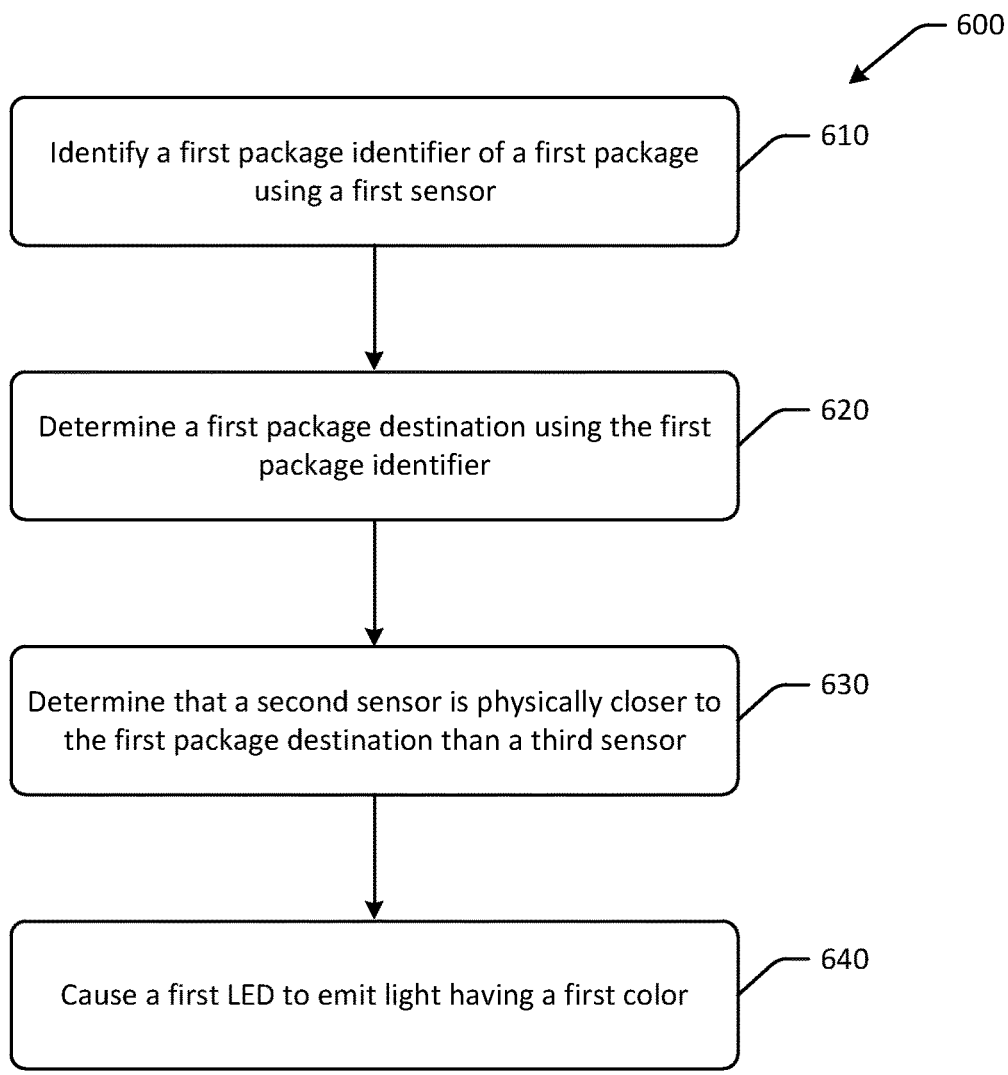
FIG. 6 is an example process flow for using a directed palletization system with lights in accordance with one or more embodiments of the disclosure.

FIG. 6 is an example process flow for using a directed palletization system with lights in accordance with one or more embodiments of the disclosure. Other embodiments may include additional or fewer operations. Some of the operations in FIG. 6 may be optional and/or performed in a different order than that depicted. Some of the operations may be performed concurrently or partially concurrently in some embodiments.

At block 610, a directed palletization system may identify a first package identifier of a first package using a first sensor. For example, the directed palletization system may include one or more sensors, such as cameras or computer vision systems that may be positioned overhead or otherwise above a conveyor. The sensors may be used to scan or otherwise identify packages on the conveyor. For example, the sensors may be used to read a machine-readable code on the package. The directed palletization system may therefore identify or determine the first package identifier of the first package using the first sensor.

At block 620, the directed palletization system may determine a first package destination using the first package identifier. For example, a controller or computer system associated with the directed palletization system may be used to determine a first package destination that is associated with the first package identifier. The first package destination may be a certain container, and may be represented as a container identifier. The first package destination may be determined using a lookup table, by querying another computer system, by determining optimal package placement, and/or using other methods.

At block 630, the directed palletization system may determine that a second sensor is physically closer to the first package destination than a third sensor. For example, the directed palletization system may determine, based at least in part on the first package destination, which sensor (e.g., RFID sensor, camera, computer vision system, barcode scanner, etc.) is closest to the first package destination. The directed palletization system may determine that a second sensor disposed adjacent to the conveyor system is closer to the first package destination than a third sensor that is also disposed adjacent to the conveyor system on the same side.

At block 640, the directed palletization system may cause a first LED to emit light having a first color. For example, depending on whether the first package is to be placed into a container on the side of the conveyor at which the first LED is located, the directed palletization system may cause the first LED to illuminate. In addition, the first LED may be illuminated a color that represents which scanner or sensor (e.g., the second sensor in the example of FIG. 6, etc.) the first package is to be scanned at, where the sensor is located physically closest to the package destination relative to the other sensors, so as to reduce the amount of walking and/or carrying of the first package the operator has to perform. Illumination of an LED may indicate that the operator is to retrieve a particular package, whereas a non-illuminated LED may indicate that the package is assigned for a package destination elsewhere (e.g., the other side of the conveyor, further downstream, etc.), such that the operator does not retrieve packages they do not have to handle.

Accordingly, in some embodiments, the directed palletization system may identify, using a first overhead sensor, a first package, determine a first package destination for the first package, and cause a first LED to illuminate indicating the first package destination and/or the scanner closest to the first package destination, and that the package is assigned to a destination near the operator. The directed palletization system may identify, using the first overhead sensor, a second package, and may determine a second package destination for the second package. The directed palletization system may cause the second LED to illuminate, and may identify, using the first overhead sensor, a third package after the second package is removed. For example, the second package may be stacked on top of the third package. The directed palletization system may then determine a third package destination for the third package, and may cause a third LED to illuminate. The directed palletization system may update LED colors and/or illumination several times a second in some embodiments.

Figure 7:
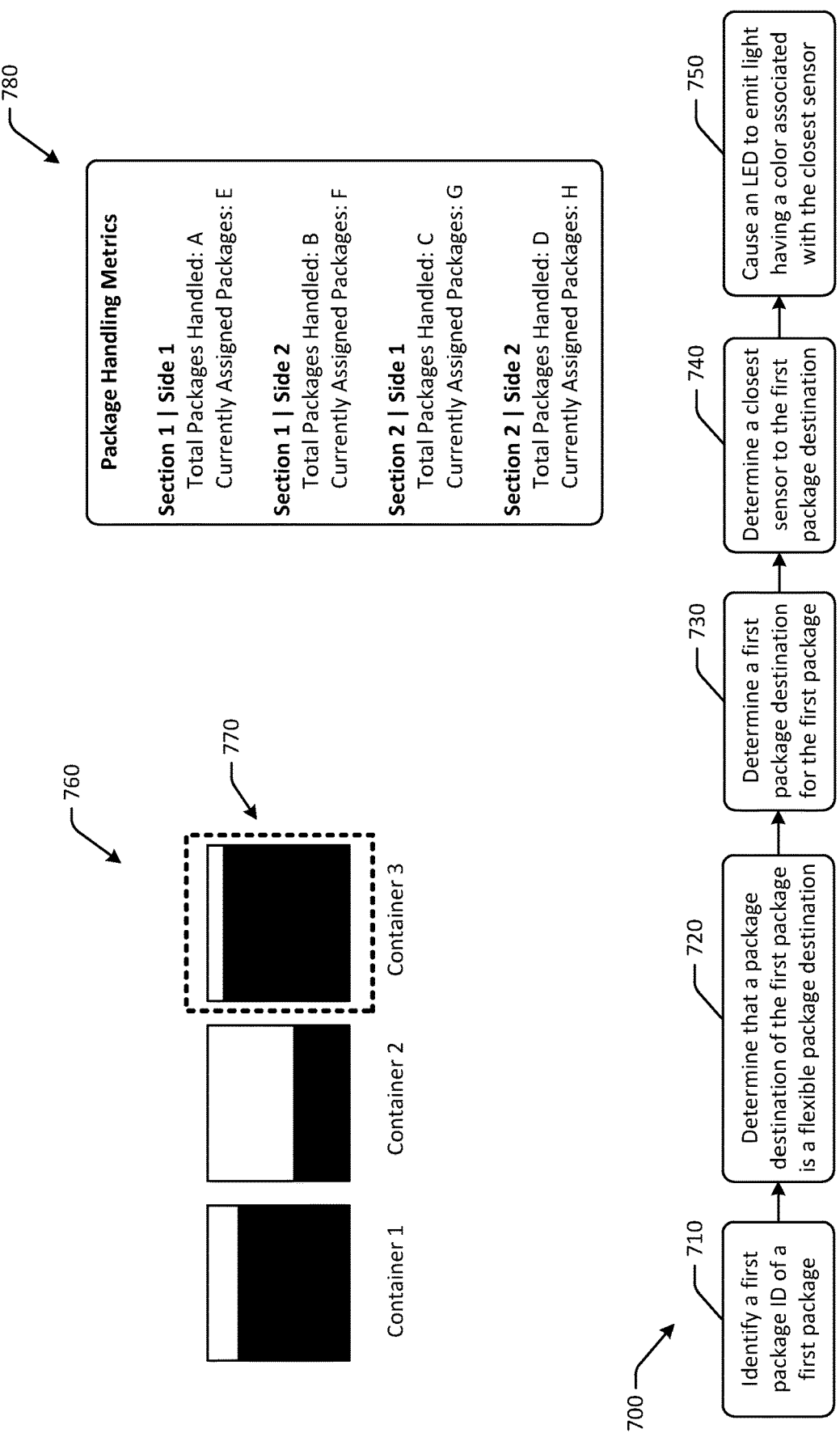
FIG. 7 is a hybrid schematic illustration of an example process flow for package allocation and various example package handling metrics in accordance with one or more embodiments of the disclosure.

FIG. 7 is a hybrid schematic illustration of an example process flow 700 for package allocation and various example package handling metrics in accordance with one or more embodiments of the disclosure. Other embodiments may include additional or fewer components. The example of FIG. 7 is for illustrative purposes only. The directed palletization system discussed with respect to FIG. 7 may be the same directed palletization system discussed with respect to FIGS. 1-6.

In FIG. 6, the process flow 700 may be executed by one or more computer systems or controllers associated with, or in communication with, a directed palletization system. The process flow 700 may be used to determine which light indicators, such as LEDs, are to be illuminated, and using which colors. The process flow 700 may be implemented to intelligently assign packages having flexible destination containers to operators automatically.

At block 710, the directed palletization system may identify a first package identifier of a first package. For example, the directed palletization system may determine or otherwise identify the first package using a camera, a scanner, or another type of sensor configured to sense packages moving along a conveyor.

At block 720, the directed palletization system may determine that a package destination of the first package is a flexible package destination. For example, the directed palletization system may use the first package identifier to determine a package destination, which may be represented as a container or pallet identifier, associated with the first package identifier. In some instances, packages may have flexible package destinations. For example, two or more pallets or containers may be used to aggregate packages having the same zip code, and a package may therefore be placed onto any of the two or more pallets. Accordingly, packages with the zip code have flexible package destinations in this example and can be placed into any of the suitable containers or pallets.

At block 730, the directed palletization system may determine a first package destination for the first package. For example, the directed palletization system may determine the available destinations for the package (e.g., which containers are suitable destinations for the package, etc.). The directed palletization system may determine or select a first package destination from the available destinations. For example, there may be three containers on a first side of the conveyor that are suitable for a package, as well as two containers on a second side of the conveyor that are suitable for the package. The directed palletization system may determine one of the five containers that the package is to be deposited into.

The directed palletization system may determine or select the first package destination based on one or more factors. In one example 760, the directed palletization system may select or determine the first package destination based at least in part on container fill rates. For example, a first container, a second container, and a third container 770 may be available destinations for the package. The containers may be filled at different levels as indicated by the shading in the example of FIG. 7. In this example, the third container 770 may be close to being filled, and can therefore be wrapped and shipped off soon, so the directed palletization system may select or determine that the first package is to be assigned to the third container 770.

In another example, the directed palletization system may determine or select the first package destination using package handling metrics 780. For example, factors such as the total number of packages an operator has handled during a shift, a number of currently assigned packages for an operator, a number upcoming packages that will be assigned to an operator (e.g., based on package identifiers from upstream sensors, etc.), and/or other factors may be used to determine or select the first package destination. For example, if an operator on a first side of the conveyor has currently handled a threshold percentage or number greater packages than an operator on a second side of the conveyor, packages with flexible destinations may be assigned to the operator on the second side of the conveyor. In another example, if the operator on the first side has a greater number of currently assigned packages, the directed palletization system may assign the package to the operator on the second side via assignment of the first package to a particular container on the second side of the conveyor.

The directed palletization system may also assign package destinations to downstream operators, as indicated by Section 1 and Section 2 in the package handling metrics 780 example of FIG. 7, where Section 2 is downstream of Section 1 and may include operators on both sides of the conveyor.

At block 740, the directed palletization system may determine a closest sensor to the first package destination. For example, after the first package destination is determined, the directed palletization system may determine which sensor is closest to the first package destination.

At block 750, the directed palletization system may cause an LED or other lighting indicator to emit light having a color associated with the closest sensor. The LED may be the LED closest to the first package, and may be disposed on a strip underneath the package along the conveyor. The LED may emit light having a certain color that is associated with a sensor, such as a barcode scanner, that is closest to the first package destination. The operator may visualize the LED, and may retrieve the first package. Using the color of the light or LED, the operator may know which sensor or scanner to use to scan the package, and the operator may then deposit the package at the first package destination.

In an embodiment, the directed palletization system may therefore include a controller configured to identify a first package identifier of a first package using an overhead or other type of sensor, and to determine that a first package destination for the first package is a flexible package destination. The controller may be further configured to determine a load balancing metric associated with the first side of the conveyor. Load balancing metrics may include container fill rates, package handling metrics, or other metrics used to balance a palletization load on operators. The controller may be configured to determine, using the load balancing metric, that the first package destination is on the first side of the conveyor, and may determine that a first sensor is physically closer to the first package destination that a second sensor. The controller may cause the first LED to emit light having the first color.

In an embodiment, the directed palletization system may therefore include a controller configured to identify a first package identifier of a first package using an overhead or other type of sensor, and to determine that a first package destination for the first package is a flexible package destination. The controller may be configured to determine a container utilization metric or container fill rate for a container on the first side of the conveyor, and may determine, using the container utilization metric, that the first package destination is on the first side of the conveyor. The controller may determine that a first sensor is physically closer to the first package destination that a second sensor. The controller may cause the first LED to emit light having the first color.

One or more operations of the methods, process flows, or use cases of FIGS. 1-7 may have been described above as being performed by a user device or controller, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
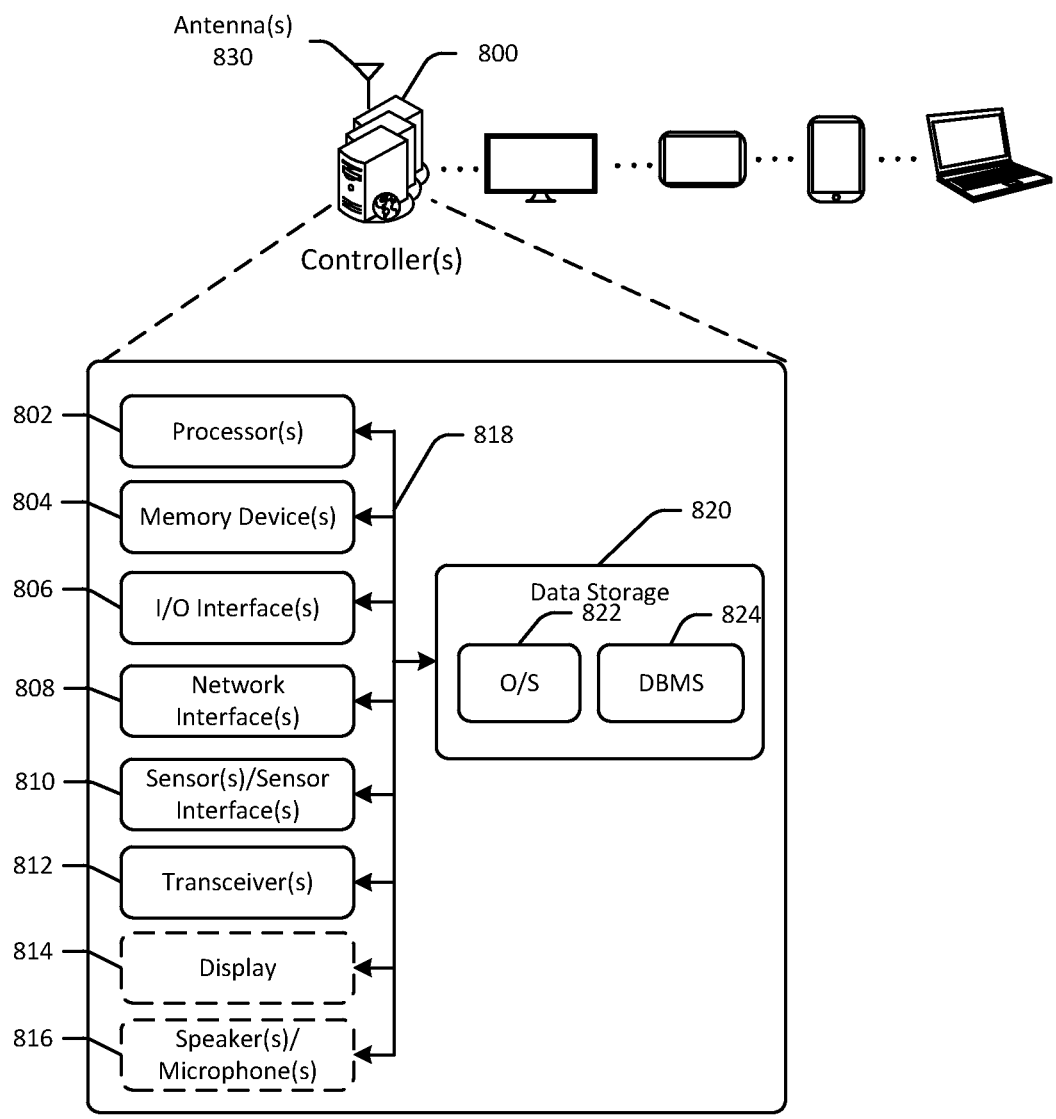
FIG. 8 schematically illustrates an example architecture of a computer system associated with a directed palletization system in accordance with one or more embodiments of the disclosure.

FIG. 8 is a schematic block diagram of one or more illustrative computer system(s) 800 associated with a directed palletization system in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for the controller and/or computer system(s) of FIGS. 1-7.

The computer system(s) 800 may be configured to communicate with one or more servers, user devices, or the like. The computer system(s) 800 may be configured to control operation of various aspects of one or more lights and/or LEDs or other lighting indicator operations, cameras or other sensors, scanners, and/or other aspects of the directed palletization system(s).

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS

824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antennas may include directional antennas, non-directional antennas, dipole antennas, folded dipole antennas, patch antennas, multiple-input multiple-output (MIMO) antennas, or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
   a conveyor configured to support a first package, a second package, and a third package, wherein the first package is adjacent to the second package on the conveyor in a side-by-side arrangement, and the third package is stacked on the second package;
   a first overhead sensor disposed over a first portion of the conveyor, the first overhead sensor configured to identify packages;
   a second overhead sensor disposed over a second portion of the conveyor, the second overhead sensor configured to identify packages;
   a first scanner disposed adjacent to the first portion of the conveyor, the first scanner configured to scan a machine-readable code on packages;
   a second scanner disposed adjacent to the second portion of the conveyor, the second scanner configured to scan a machine-readable code on packages;
   a first row of light emitting diodes (LEDs) disposed along a first side of the conveyor, the LEDs configured to emit light having a first color and light having a second color; and
   a second row of LEDs disposed adjacent to the first row of LEDs, the LEDs configured to emit light having the first color and light having the second color;
   wherein the first row of LEDs comprises a first LED adjacent to the first package, and the second row of LEDs comprises a second LED adjacent to the first package; and
   wherein a color of the first LED indicates that the first scanner is to be used to scan a first machine-readable code on the first package, and a color of the second LED indicates that the second scanner is to be used to scan a second machine-readable code on the third package.

2. The system of claim 1, further comprising:
   a third row of LEDs disposed along a second side of the conveyor, the LEDs configured to emit light having the first color and light having the second color; and
   a fourth row of LEDs disposed adjacent to the third row of LEDs, the LEDs configured to emit light having the first color and light having the second color;
   wherein the third row of LEDs comprises a third LED adjacent to the second package, and the fourth row of LEDs comprises a fourth LED adjacent to the second package; and
   wherein one of either the first LED or the third LED is illuminated at a same time, and one of either the second LED or the fourth LED is illuminated at the same time.

3. The system of claim 1, further comprising:
   determining, using the first scanner, that the first machine-readable code on the first package has been scanned;
   causing presentation of a package destination for the first package; and
   determining that the first package has been deposited at the package destination.

4. The system of claim 1, further comprising:
   identifying, using the first overhead sensor, the first package;
   determining a first package destination for the first package;
   causing the first LED to illuminate;
   identifying, using the first overhead sensor, the third package;
   determining a second package destination for the third package;
   causing the second LED to illuminate;
   identifying, using the first overhead sensor, the second package after the third package is removed;
   determining a third package destination for the second package; and
   causing the third LED to illuminate.

5. A system comprising:
   a conveyor configured to support a first package and a second package;
   a first set of LEDs disposed along a first side of the conveyor, the first set of LEDs comprising a first LED;
   a second set of LEDs disposed adjacent to the first set of LEDs, the second set of LEDs comprising a second LED;
   a first sensor configured to identify the first package and the second package; and
   a second sensor disposed on the first side of the conveyor;
   wherein illumination of the first LED indicates that the first package is to be scanned at the first side of the conveyor.

6. The system of claim 5, further comprising:
   a third sensor disposed on the first side of the conveyor;
   wherein a first color of the first LED indicates that the first package is to be scanned at the second sensor, and a second color of the second LED indicates that the second package is to be scanned at the third sensor.

7. The system of claim 5, further comprising:
   a third set of LEDs disposed along a second side of the conveyor, the third set of LEDs comprising a third LED;
   a fourth set of LEDs disposed adjacent to the third set of LEDs, the fourth set of LEDs comprising a fourth LED;
   a fourth sensor disposed on the second side of the conveyor; and
   a fifth sensor disposed on the second side of the conveyor;
   wherein one of the first LED and the third LED is illuminated at a same time, and wherein one of the second LED and the fourth LED is illuminated at a same time.

8. The system of claim 7, wherein the conveyor is further configured to support a third package adjacent to the first package in a side-by-side arrangement across a width of the conveyor, and wherein a fourth color of the fourth LED indicates that the third package is to be scanned at the third sensor.

9. The system of claim 5, wherein a first color of the first LED indicates a first package destination of the first package, and a second color of the second LED indicates a second package destination of the second package.

10. The system of claim 5, further comprising:
a controller configured to:
identify a first package identifier of the first package using the first sensor;
determine a first package destination using the first package identifier;
determine that the second sensor is physically closer to the first package destination than the third sensor; and
cause the first LED to emit light having the first color.

11. The system of claim 5, further comprising:
a controller configured to:
identify a first package identifier of the first package using the first sensor;
determine that a first package destination for the first package is a flexible package destination;
determine a load balancing metric associated with the first side of the conveyor;
determine, using the load balancing metric, that the first package destination is on the first side of the conveyor;
determine that the second sensor is physically closer to the first package destination than the third sensor; and
cause the first LED to emit light having the first color.

12. The system of claim 5, further comprising:
a controller configured to:
identify a first package identifier of the first package using the first sensor;
determine that a first package destination for the first package is a flexible package destination;
determine a container utilization metric for a container on the first side of the conveyor;
determine, using the container utilization metric, that the first package destination is on the first side of the conveyor;
determine that the second sensor is physically closer to the first package destination than the third sensor; and
cause the first LED to emit light having the first color.

13. The system of claim 5, wherein the second sensor is disposed adjacent to a downstream portion of the conveyor, and the third sensor is disposed adjacent to an upstream portion of the conveyor, the system further comprising:
a first container disposed adjacent to the downstream portion of the conveyor; and
a second container disposed adjacent to the upstream portion of the conveyor.

14. The system of claim 13, wherein the second sensor indicates that a first package destination for the first package is the first container, and wherein the third sensor indicates that a second package destination for the second package is the second container.

15. The system of claim 5, wherein the first package and the second package are in a side-by-side arrangement along a width of the conveyor, such that the first package is adjacent to the first side of the conveyor, and the second package is adjacent to a second side of the conveyor, and wherein the first LED and the second LED are vertically aligned.

16. The system of claim 5, wherein the first package and the second package are separated along a length of the conveyor, such that the first package is adjacent to a downstream portion of the conveyor, and the second package is adjacent to an upstream portion of the conveyor, and wherein the first LED and the second LED are laterally aligned.

17. The system of claim 5, wherein the first LED and the second LED are dual-color LEDs.

18. A system comprising:
a conveyor configured to support a first package and a second package;
a first set of LEDs disposed along a first side of the conveyor, the first set of LEDs comprising a first LED;
a second set of LEDs disposed adjacent to the first set of LEDs, the second set of LEDs comprising a second LED;
a computer vision system configured to identify the first package and the second package;
a first sensor disposed on the first side of the conveyor;
a second sensor disposed on the first side of the conveyor;
a third sensor disposed on the second side of the conveyor;
a fourth sensor disposed on the second side of the conveyor;
wherein a first color of the first LED indicates that the first package is to be scanned at the second sensor, and a second color of the second LED indicates that the second package is to be scanned at the third sensor.

19. The system of claim 18, further comprising:
a controller configured to:
identify a first package identifier of the first package using the first sensor;
determine a first package destination using the first package identifier;
determine that the second sensor is physically closer to the first package destination than the third sensor; and
cause the first LED to emit light having the first color.

20. The system of claim 18, further comprising:
a third set of LEDs disposed along a second side of the conveyor, the third set of LEDs comprising a third LED; and
a fourth set of LEDs disposed adjacent to the third set of LEDs, the fourth set of LEDs comprising a fourth LED.

* * * * *